(12) United States Patent
Kim et al.

(10) Patent No.: US 8,564,568 B2
(45) Date of Patent: Oct. 22, 2013

(54) TOUCH PANEL

(75) Inventors: Kyu Sik Kim, Yongin-si (KR); Jae young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 364 days.

(21) Appl. No.: 12/685,349

(22) Filed: Jan. 11, 2010

(65) Prior Publication Data

US 2011/0043460 A1    Feb. 24, 2011

(30) Foreign Application Priority Data

Aug. 19, 2009  (KR) .................. 10-2009-0076864

(51) Int. Cl.
*G06F 3/042*   (2006.01)
(52) U.S. Cl.
USPC .......................................... 345/175; 345/173
(58) Field of Classification Search
USPC .................................................. 345/173–179
See application file for complete search history.

(56) References Cited

U.S. PATENT DOCUMENTS

| | | | | |
|---|---|---|---|---|
| 5,906,753 | A * | 5/1999 | Aoyagi et al. | 216/24 |
| 6,974,953 | B2 * | 12/2005 | Iida et al. | 250/338.1 |
| 2006/0157716 | A1 * | 7/2006 | Sugitatsu et al. | 257/79 |
| 2008/0122803 | A1 * | 5/2008 | Izadi et al. | 345/175 |
| 2008/0211786 | A1 * | 9/2008 | Park et al. | 345/175 |
| 2009/0027358 | A1 * | 1/2009 | hosono | 345/175 |

FOREIGN PATENT DOCUMENTS

| | | |
|---|---|---|
| JP | 2003-262850 | 9/2003 |
| KR | 10-20070051679 | 5/2007 |
| KR | 10-2007-0113105 | 11/2007 |
| KR | 10-2008-0028270 | 3/2008 |
| KR | 10-2009-0026957 | 3/2009 |

* cited by examiner

*Primary Examiner* — Alexander Eisen
*Assistant Examiner* — Robin Mishler
(74) *Attorney, Agent, or Firm* — Cantor Colburn LLP

(57) ABSTRACT

A touch panel includes an infrared ("IR") sensor and an IR source that supplies IR light to the infrared sensor. The IR sensor includes an absorbing layer and a PN junction layer disposed on the absorbing layer. The absorbing layer includes a material that selectively absorbs light having a wavelength in an infrared range. The PN junction layer includes a P-type organic material layer and an N-type organic material layer.

13 Claims, 1 Drawing Sheet

TOUCH PANEL

CROSS-REFERENCE TO RELATED APPLICATION

This application claims priority to Korean Patent Application No. 2009-0076864, filed on Aug. 19, 2009, and all the benefits accruing therefrom under 35 U.S.C. §119, the content of which in its entirety is herein incorporated by reference.

BACKGROUND

1) Field

The general inventive concept relates to a touch panel having an infrared sensor.

2) Description of the Related Art

A touch panels is a type of user interface that is generally disposed on a display device to detect a touch point based on a change in an electrical characteristic caused by contact of a hand or stylus, for example, which touches the touch panel. The touch panel is often used in devices such as compact portable terminals and office equipment.

Generally, the touch panel includes a transparent substrate, infrared ("IR") light emitting diodes ("LEDs") and an IR sensor array. The touch panel is operated by supplying IR rays from the IR LEDs to the transparent substrate and receiving the IR rays, which pass through the transparent substrate, with the IR sensor. However, when the transparent substrate is touched, IR rays that pass through a corresponding portion the transparent substrate are scattered and, as a result, the IR sensor does not receive the IR rays that are scattered. Thus, a position corresponding to the portion at which the IR rays are not received (due to the scattering) may be incorrectly recognized as a touch point.

The touch panel is generally included in a touch display system, and, more particularly, the touch panel is typically disposed on a display device, such as a cathode-ray tube ("CRT") monitor or a liquid crystal display ("LCD"), for example. The touch panel generally has a separate IR filter, disposed near an upper portion of the IR sensor, to improve a function of the IR sensor and a reliability of recognition of the touch point.

SUMMARY

In one or more example embodiments, an infrared ("IR") sensor, which may included in a touch panel, is formed in a stacked structure including an absorbing layer and a PN junction layer, unlike a conventional touch panel that requires a separate IR sensor and a separate IR filter.

In at least one aspect, a touch panel includes an IR sensor having an absorbing layer including a material that selectively absorbs light having a wavelength in an IR range, and a PN junction layer disposed under the absorbing layer and having a P-type organic material layer and an N-type organic material layer. The touch panel further includes an IR source that supplies infrared radiation to the infrared sensor.

The IR range may be a wavelength range from between about 700 nanometers (nm) and about 1100 nm.

The material that selectively absorbs the light may be selected from a group consisting of phthalocyanines, naphthoquinones, naphthalocyanines, pyrroles, polymer condensed azos, metal complex organic dyes, anthraquinones, cyanines, anthimonies and any combinations or complexes thereof.

The PN junction layer may be formed in a stacked structure. The stacked structure may include a P-type organic material layer disposed on an N-type organic material layer. In an additional embodiment, the stacked structure may include a P-type organic material layer, an N-type organic material layer disposed on the N-type organic material layer, and an intrinsic layer disposed between the P-type organic material layer and the N-type organic material layer.

The IR sensor may further include at least one layer selected from: a first electrode layer disposed on the P-type organic material layer; a first buffer layer disposed between the first electrode layer and the P-type organic material layer; a second electrode layer disposed under the N-type organic material layer and having a work function that is smaller than a work function of the first electrode layer; and a second buffer layer disposed between the N-type organic material layer and the second electrode layer.

The touch panel may further include a backlight, and the IR source may be disposed in the backlight.

The touch panel may further include a frontlight, and the IR source may be disposed in the frontlight.

The touch panel may further include a plurality of the infrared sensors and a plurality of the infrared sources, and the infrared sensors and the infrared sources may be alternately disposed in the touch panel.

The touch panel may include a touch screen, the IR source may irradiate IR radiation to an object through the touch screen and the IR sensor may detect IR radiation reflected from the object.

The IR source may include a light emitting diode ("LED").

In one or more other aspects, the touch panel further includes a display that displays an image on the touch screen. The display may be a liquid crystal display ("LCD") or an LED display.

BRIEF DESCRIPTION OF THE DRAWINGS

The above and/or other aspects of the general inventive concept will become more readily apparent by describing in further detail example embodiments thereof with reference to the accompanying drawings, in which.

DETAILED DESCRIPTION

Figure 1:
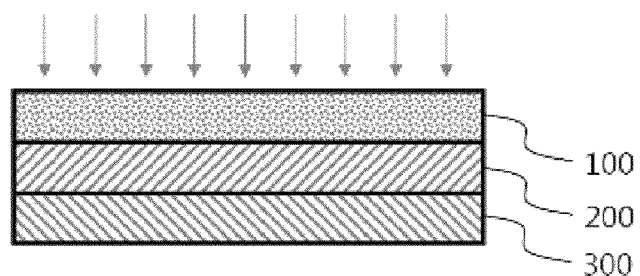
FIG. 1 is a partial cross-sectional view of an example embodiment of a infrared ("IR") sensor of a touch panel.

The general inventive concept now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, aspects and methods embodying the general inventive concept will be described in further detail with reference to the accompanying drawings. However, it will be understood that the general inventive concept is not limited to the example embodiments described herein, and thus may be embodied in various forms.

According to one or more example embodiments, a touch panel includes an infrared ("IR") sensor (FIG. 1) for sensing the position of an object on a touch screen, and an IR source (not shown) that emits IR radiation.

FIG. 1 is a partial cross-sectional view of one example embodiment of an IR sensor.

Referring to FIG. 1, the IR sensor includes an absorbing layer 100 formed of a material that selectively absorbs radiation, e.g., light having a specific wavelength such as IR radiation having a wavelength in the IR range, and PN junction layers 200 and 300, which are layers having one or more junctions of P- and N-type semiconductors, and are disposed under the absorbing layer 100, as shown in FIG. 1. The PN junction layers 200 and 300 may be formed of organic materials, but alternative example embodiments are not limited thereto.

The absorbing layer 100 selectively absorbs light having a wavelength in the IR range, thereby effectively preventing absorption of light having a wavelength outside of the IR range (e.g., for visible light, example) in the PN junction layer. As a result, the touch panel according to one or more example embodiments does not need a separate IR filter, and a device having the touch panel is compact and thin, as compared to devices that require a separate IR filter.

As shown in FIG. 1, the absorbing layer 100 is in a stacked structure with the PN junction layers 200 and 300, which are formed thereunder. Accordingly, separate formation and installation processes are not required, resulting in substantially improved manufacturing process efficiency.

The absorbing layer 100 is formed of a material that selectively absorbs the light having the wavelength in the IR range. As used hereinafter, the term "selectively absorbing" refers to absorbing certain portions of wavelengths in a given range, such as a portion of wavelengths including about 50 percent (%), about 60% or, alternatively, about 70% (or more) of the wavelengths in a given range. In addition, the IR range may be a near IR range, between about 700 nanometers (nm) to about 1100 nm or, alternatively, between about 800 nm to about 1100 nm, but additional embodiments are not limited to the foregoing ranges or wavelengths.

The material that selectively absorbs the IR range (hereinafter referred to as a "selective IR absorbing material") may be a material that selectively absorbs light only in the IR range, and may be an organic or, alternatively, an inorganic material. A material having selective IR absorbance, and which is also transparent, may also be used in one or more example embodiments.

As noted above, the selective IR absorbing material may be an organic material, such as an organic pigment, for example, selected from the group consisting of phthalocyanines, naphthoquinones, naphthalocyanines, pyrroles, polymer condensed azos, metal complex organic dyes, anthraquinones, cyanines, antimonies and combinations or complexes thereof. The selective IR absorbing material may be mixed with an inorganic material, such as antimony, for example, and, additionally, a nano-scale microparticle may be used to provide adequate transparency.

The selective IR absorbing material is not limited to the foregoing examples, and, in addition, may be about 10 to 90 weight percent (wt %) of a total content of the absorbing layer 100, although alternative example embodiments are not limited thereto.

In one or more example embodiments, the absorbing layer 100 may include various additives in addition to the selective IR absorbing material, and thus may further include, for example, an insulating material and/or a binder material to increase bonding strength with the PN junction layers 200 and 300 disposed under the absorbing layer.

A method of forming the absorbing layer 100 is not particularly limited, and may include, for example, deposition, spin coating or sol-gel.

The PN junction layers 200 and 300 perform photoelectric conversion by absorbing the light having the wavelength in the IR range, and which enters the PN junction layers 200 and 300 from the absorbing layer 100. More specifically, for example, the PN junction layers 200 and 300 may be formed in a stacked structure, and may include a P-type organic material layer 200 and an N-type organic material layer 300 or, alternatively, a stacked structure including a P-type organic material layer 200, an intrinsic layer (not shown) and an N-type organic material layer 300.

A type of material used in the P-type and N-type organic material layers 200 and 300 is not particularly limited, and may include organic material. More specifically, for example, the P-type organic material layer 200 may be formed of a semiconductor material in which holes serve as majority carriers. In addition, the N-type organic material layer 300 may be formed of a semiconductor organic material in which electrons serve as majority carriers. In some example embodiments, the P-type organic material layer 200 and the N-type electrode layer 300 may be formed of a light absorbing organic material that selectively absorbs only light having an IR wavelength.

The intrinsic layer (not shown) is formed by depositing a P-type organic material and an N-type organic material. The P-type organic material may be substantially the same material as the material that forms the P-type organic material layer 200. In addition, the N-type organic material may be substantially the same as the material that forms the N-type organic material 300, but alternative example embodiments are not limited thereto.

Figure 2:
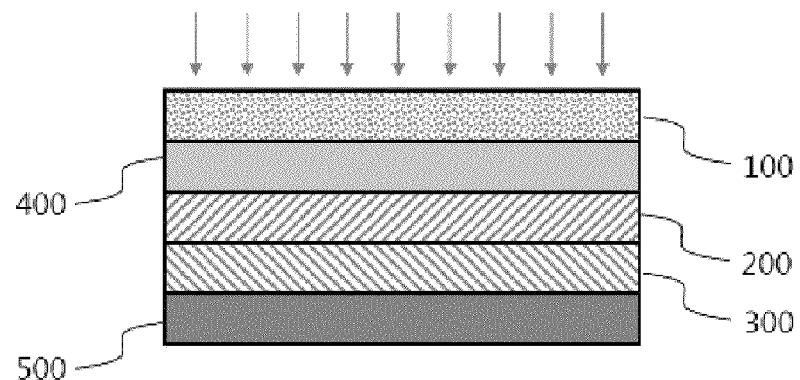
FIG. 2 is a partial cross-sectional view of another example embodiment of an IR sensor of a touch panel.

Referring now to FIG. 2, in one or more example embodiments, the IR sensor may further include at least one selected from the following layers a first electrode layer 400 disposed on the P-type organic material layer 200; a first buffer layer (not shown) disposed between the first electrode layer 400 and the P-type organic material layer 200; a second electrode layer 500 disposed under the N-type organic material layer 300 and having a smaller work function ("WF") than the first electrode layer 400; and a second buffer layer (not shown) disposed between the N-type organic material layer 300 and the second electrode layer 500.

Thus, the IR sensor according to one or more example embodiments may be formed in various stacked structures, as will be described in further detail below. Specifically, the layers of the IR sensor may be sequentially stacked in at least the following manners, described as the layers are sequentially stacked moving away from a touch screen (not shown):

i) an absorbing layer 100/a first electrode layer 400/a first buffer layer (not shown)/a P-type organic material layer 200/an intrinsic layer (not shown)/an N-type organic material layer 300/a second buffer layer (not shown)/a second electrode layer 500;

ii) an absorbing layer 100/a first electrode layer 400/a P-type organic material layer 200/an intrinsic layer (not shown)/an N-type organic material layer 300/a second buffer layer (not shown)/a second electrode layer 500;

iii) an absorbing layer 100/a first electrode layer 400/a first buffer layer (not shown)/a P-type organic material layer 200/an intrinsic layer (not shown)/an N-type organic material layer 300/a second electrode layer 500;

iv) an absorbing layer 100/a first electrode layer 400/a P-type organic material layer 200/an intrinsic layer (not shown)/an N-type organic material layer 300/a second electrode layer 500; or v) an absorbing layer 100/a first electrode layer 400/a P-type organic material layer 200/an N-type organic material layer 300/a second electrode layer 500.

FIG. 2 is a partial cross-sectional view of another example embodiment of an IR sensor of a touch panel. Specifically, FIG. 2 illustrates a schematic IR sensor formed in the stacked structure of example embodiment v) above.

Referring to FIG. 2, in the IR sensor according to an example embodiment is formed in the stacked structure, and when a negative voltage is applied to a first electrode 400, e.g., the first electrode layer 400, and a positive voltage is applied to a second electrode 500, e.g., the second electrode layer 500, and then light is applied (such as by an IR source that supplies IR radiation, for example), electrons and holes combine to generate excitons. A large number of excitons are formed in a P-type electrode layer, such as the P-type electrode layer 200, and electrons travel from the N-type organic material layer 300 and/or the buffer layer (not shown) to the second electrode layer 500 to create a current corresponding to the IR wavelength range.

The first electrode layer 400 and the second electrode layer 500 may be transparent electrodes, and the first electrode layer 400 may have a larger work function than the second electrode layer 500. The transparent electrode material may be selected from the group consisting of indium tin oxide ("ITO"), indium zinc oxide ("IZO"), zinc oxide (ZnO), tin oxide ($SnO_2$), antimony-doped tin oxide ("ATO"), aluminum (Al)-doped zinc oxide ("AZO"), gallium-doped zinc oxide ("GZO"), titanium dioxide ($TiO_2$) and fluorine-doped tin oxide ("FTO"). The second electrode layer 500 may be a metal electrode formed of a metal selected from the group consisting of aluminum (Al), copper (Cu), titanium (Ti), gold (Au), platinum (Pt), silver (Ag) and chromium (Cr). When the second electrode layer 500 is formed of a metal, it may be formed to a thickness from of about 20 nm or less for transparency.

The buffer layer (not shown) allows easy transport of the charges, and may be formed of a charge transport material (e.g., an aryl compound, but not being limited thereto).

More specifically, the first buffer layer may be formed of, but is not limited to, polyethylene dioxythiophene/polystyrenesulfonate ("PEDOT/PSS"). The second buffer layer may be formed of, but is not limited to, 2,9-dimethyl-4,7-diphenyl-1,10-phenanthroline ("BCP"), lithium fluoride (LiF), copper phthalocyanine, polythiophene, polyaniline, polyacetylene, polypyrrole, polyphenylenevinylene or derivatives thereof.

In one or more example embodiments, the touch panel includes the IR source, but the type of the IR source is not particularly limited. For example, the IR source may be a backlight or a frontlight. Specific examples of the IR source may include, but are not limited to, a light emitting diode ("LED") and an organic light emitting diode ("OLED").

Additional example embodiments may include a plurality of the IR sensors and/or a plurality of the IR sources, and these may be alternately disposed in or on the touch panel. In one example embodiment, the IR source supplies IR rays (e.g., IR radiation) to a lower transparent substrate of a liquid crystal panel (not shown) through an air layer and is not necessarily disposed to correspond to each pixel of the liquid crystal panel. The intensity of the IR source is reflected from a transmitted material and/or an object in contact with an upper portion of the liquid crystal and the reflected light is received in the IR sensor.

Thus, an intensity of the IR source may be adjusted to be reflected within several millimeters (mm), for example, of a thickness of a liquid crystal module including the liquid crystal panel and the backlight unit. Thus, the number of the IR sources may be adjusted according to a brightness of the IR light emitting diode, a radiation angle and a screen size of the liquid crystal display panel, for example.

The touch panel may further include a display (not shown) that displays an image on a touch screen (not shown).

Examples of displays may include, but are not limited to, a liquid crystal display ("LCD") and an organic light emitting diode ("OLED").

As noted above, the touch panel according to one or more example embodiments performs photoelectric conversion by absorbing the IR rays. Thus, the touch panel includes an IR sensor having a sufficient IR selectivity, and thus a separate IR filter is not required. Therefore, the touch panel stably detects IR rays and recognizes a touch point even without the separate IR filter, resulting in substantially improved economic and manufacturing efficiencies.

While the general inventive concept has been particularly shown and described with reference to example embodiments thereof, it will be understood by those of ordinary skill in the art that various changes in form and details may be made therein without departing from the spirit or scope of the present invention as defined by the following claims.

What is claimed is:

1. A touch panel comprising:
    an infrared sensor comprising:
        an absorbing layer including a material which selectively absorbs light having a wavelength in an infrared range;
        a PN junction layer disposed on the absorbing layer, wherein the PN junction layer comprises a P-type organic material layer and an N-type organic material layer; and
        a transparent electrode comprising at least one of a first electrode layer disposed on the P-type organic material layer, and a second electrode layer disposed under the N-type organic material layer and having a work function which is smaller than a work function of the first electrode layer; and
        at least one of a first buffer layer disposed between the first electrode layer and the P-type organic material layer; and a second buffer layer disposed between the N-type organic material layer and the second electrode layer; and
    an infrared source which supplies infrared radiation to the infrared sensor,
    wherein one of the P-type organic material layer and the N-type organic material layer is disposed between the absorbing layer and the other of the P-type organic material layer and the N-type organic material layer.

2. The touch panel according to claim 1, wherein the infrared range is a wavelength range from about 700 nanometers to about 1100 nanometers.

3. The touch panel according to claim 1, wherein the material which selectively absorbs the light is selected from a group consisting of phthalocyanines, naphthoquinones, naphthalocyanines, pyrroles, polymer condensed azos, metal complex organic dyes, anthraquinones, cyanines, anthimonies and any combinations or complexes thereof.

4. The touch panel according to claim 1, wherein
    the PN junction layer is disposed in a stacked structure, and
    the stacked structure comprises a P-type organic material layer disposed on an N-type organic material layer.

5. The touch panel of claim 1, wherein
    the PN junction layer is disposed in a stacked structure, and
    the stacked structure comprises:
    a P-type organic material layer;
    an N-type organic material layer disposed on the P-type organic material layer; and
    an intrinsic layer disposed between the P-type organic material layer and the N-type organic material layer.

6. The touch panel according to claim 1 further comprising a backlight, wherein the infrared source is disposed in the backlight.

7. The touch panel according to claim 1, further comprising a frontlight, wherein the infrared source is disposed in the frontlight.

8. The touch panel according to claim 1, further comprising a plurality of the infrared sensors and a plurality of the infrared sources, wherein the infrared sensors and the infrared sources are alternately disposed in the touch panel.

9. The touch panel according to claim 1, further comprising a touch screen, wherein
    the infrared source irradiates the infrared radiation onto an object through the touch screen, and
    the infrared sensor detects infrared radiation reflected from the object.

10. The touch panel according to claim 9, wherein the infrared source includes a light emitting diode.

11. The touch panel according to claim 9, further comprising a display which displays an image on the touch screen.

12. The touch panel according to claim 11, wherein the display includes a liquid crystal display.

13. The touch panel according to claim 11, wherein the display includes a light emitting diode display.

* * * * *